United States Patent [19]
Kunimoto et al.

[11] Patent Number: 5,101,404
[45] Date of Patent: Mar. 31, 1992

[54] SIGNALLING APPARATUS FOR USE IN AN ATM SWITCHING SYSTEM

[75] Inventors: Masao Kunimoto, Yokohama; Jiro Kashio, Kawasaki; Makoto Mori; Shinobu Gohara, both of Yokohama, all of Japan

[73] Assignee: Hitachi, Ltd., Tokyo, Japan

[21] Appl. No.: 397,048

[22] Filed: Aug. 21, 1989

Related U.S. Application Data

[63] Continuation-in-part of Ser. No. 313,601, Feb. 21, 1989.

[30] Foreign Application Priority Data

Aug. 26, 1988 [JP] Japan ................ 63-210718
Jun. 21, 1989 [JP] Japan ................ 1-156772

[51] Int. Cl.[5] ........................... H04Q 11/04
[52] U.S. Cl. ........................ 370/60; 370/60.1
[58] Field of Search ........... 370/58.1, 58.2, 58.3, 370/60, 60.1, 94.1, 94.2

[56] References Cited

U.S. PATENT DOCUMENTS 4,947,388  8/1990  Kuwahara et al. ............... 370/60
4,956,839  9/1990  Torii et al. ................... 370/94.1

FOREIGN PATENT DOCUMENTS 0183592    8/1985  European Pat. Off. .
62-131652 12/1985  Japan .
63-78637   9/1986  Japan .
84/00265   of 1984 PCT Int'l Appl. .
2184327    6/1987  United Kingdom .

OTHER PUBLICATIONS

Jean-Pierre Coudreuse, et al., "Prelude: An Asynchronous Time-Division Switched Network", ICC-87, Session 22, Paper 2, vol. 2, Jun. 7, 1987. (Provided in English)

Primary Examiner—Douglas W. Olms
Assistant Examiner—Wellington Chin
Attorney, Agent, or Firm—Fay, Sharpe, Beall, Fagan, Minnich & McKee

[57] ABSTRACT

A subscriber line signalling apparatus for use in an asynchronous mode communication system includes a switching circuit having a plurality of input terminals and a plurality of output terminals. The switching circuit selectively communicates fixed length information packets to an adaptation processing unit. The adaptation processing unit reassembles the fixed length packets to signalling frames, and transmits them to a frame processor.

20 Claims, 11 Drawing Sheets

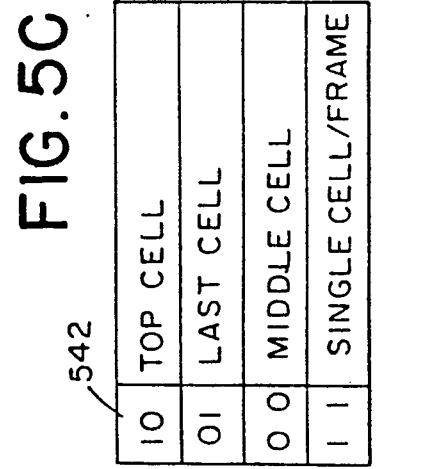
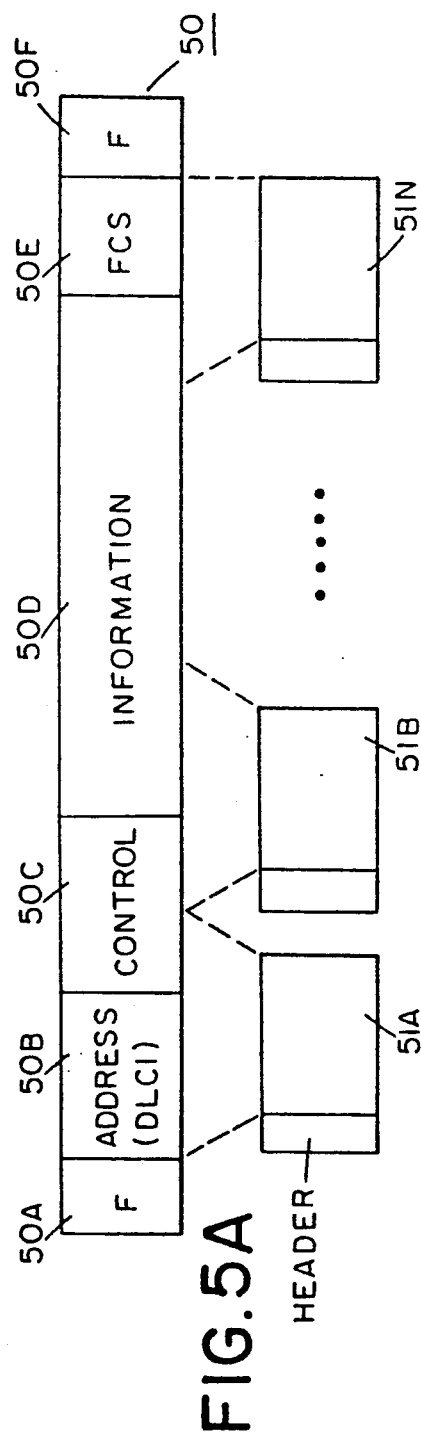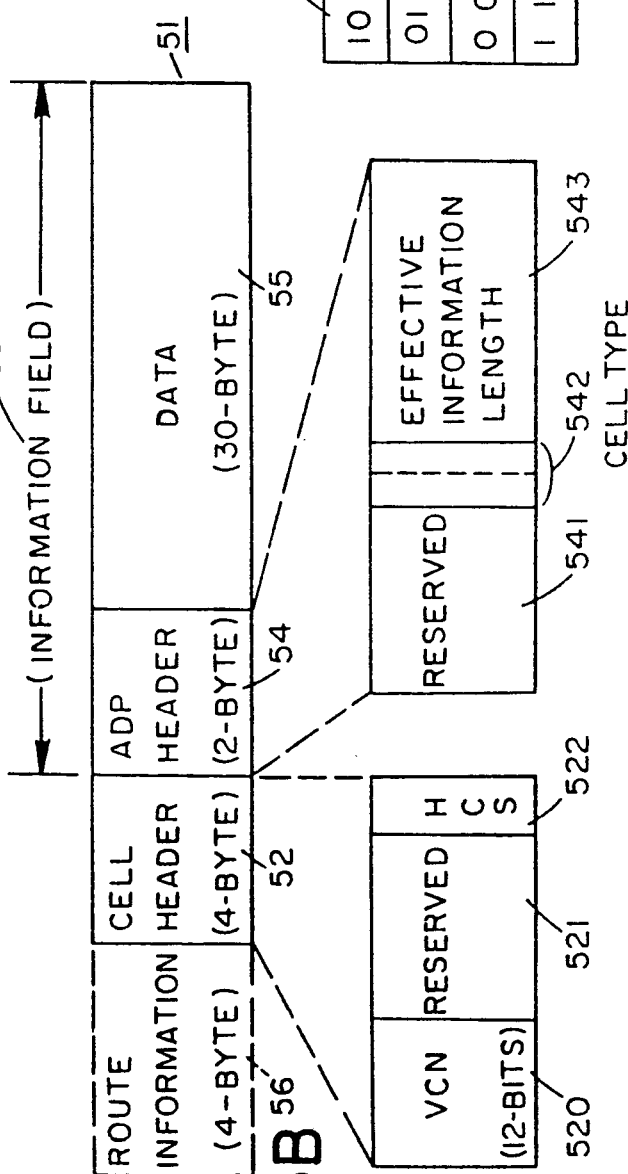

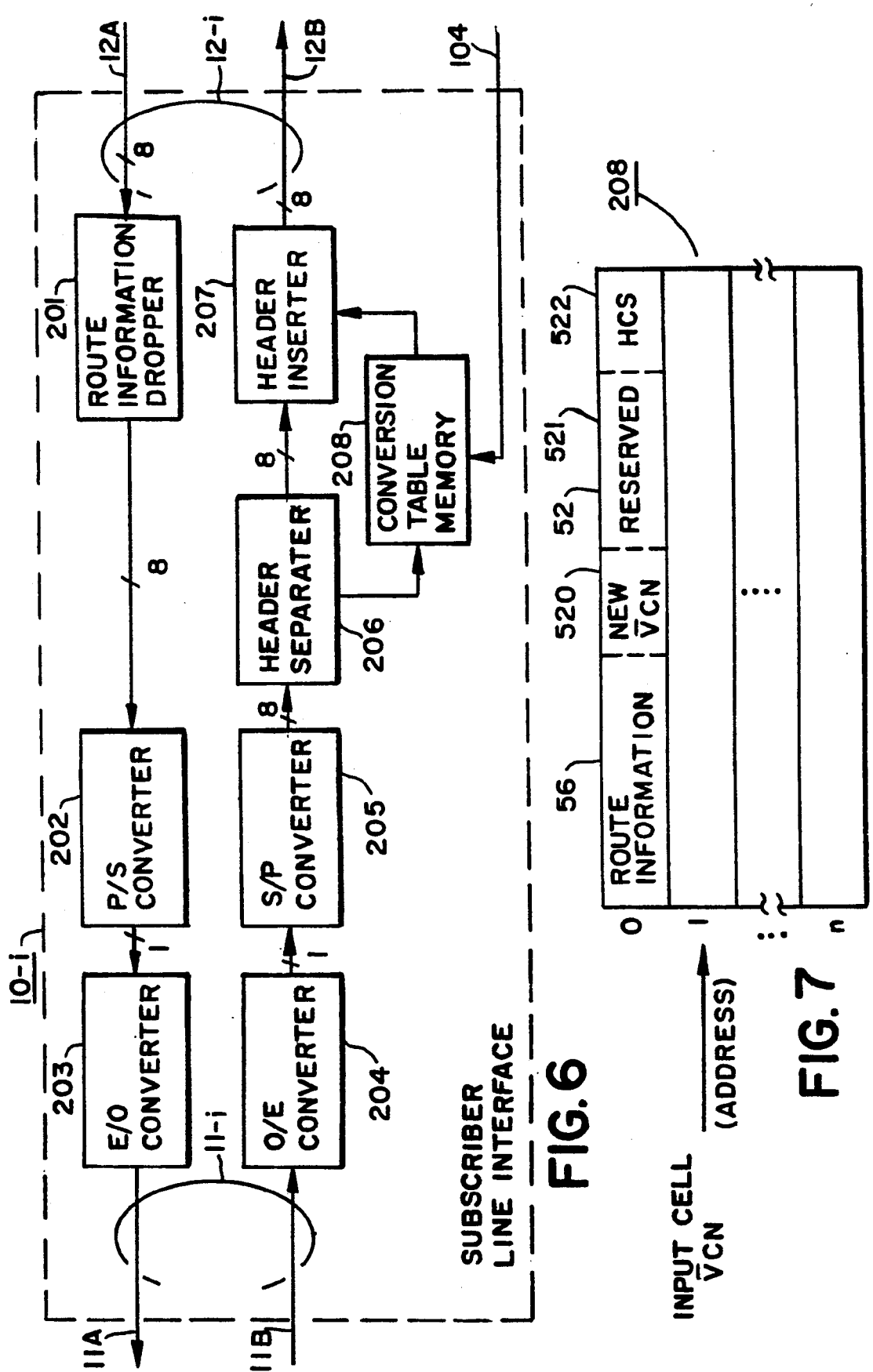

SIGNALLING APPARATUS FOR USE IN AN ATM SWITCHING SYSTEM

This application is a continuation-in-part of copending U.S. patent application Ser. No. 313,601 filed Feb. 21, 1989, the contents of which are incorporated herein by reference.

BACKGROUND OF THE INVENTION

The present invention relates to generally to signalling apparatuses, and more particularly to a signalling apparatus for use in an ATM (Asynchronous Transfer Mode) switching system.

An ISDN (Integrated Services Digital Network) is provided with two types of channels, namely, information channels (or B or H channels) for transfer of user's information, and signalling channels (or "D channels") for transfer of control signals for setting channels.

A layered data processing scheme utilizes a three layer structure. In layer 2 functions commonly accomplished by LAPD (Link Access Procedure on the D-channel) devices are accomplished. In layer 3, call control in accordance with the I.451 standard is accomplished.

In an earlier method of processing signalling channels in an ISDN switching system, signalling channels from a plurality of subscriber lines are separated from information channels. Only the signalling channels are multiplexed and guided to a signalling processor. Thereafter, the processes of layer 2 (LAPD) and layer 3 (call control) are performed. See for example, FIG. 12 of "Signalling Processing in an I-Interface Switching System", IEICE (The Institute of Electronics Information and Communication Engineers) Technical Report SE 87-85, or Japanese Laid-Open Patent Application No. 131652/1987.

The International Telegraph and Telephone Consultative Committee ("CCITT") is now considering a "broadband ISDN" as the next generation ISDN. The broadband ISDN is an attempt to provide switching services at a line rate of, for example, 150 Mbit/s. CCITT Draft Recommendation I.121 cites the ATM (Asynchronous Transfer Mode) as a favorable means for implementing the abovementioned broadband ISDN.

The ATM switching system is a system in which all data, including control signals and information, are transferred in fixed-length packets called "cells". For example, when a signalling frame 50 is to be transmitted from a subscriber's terminal, as shown in FIG. 5(A), the frame 50 is segmented into fixed length cells 51A–51N, which cells are then transmitted through the subscriber line. An ADP processing unit in the switching system will then reassemble the signal frame 50 from the cells 51A–51N received thereby, and LAPD-LSI 102 performs layer 2 functions for a signally channel (which is called "LAPD"). Signalling processor 40 processes functions of layer 3 for a signally channel (which is called "call control"). When, on the other hand, a signal frame is to be transmitted from the switching system to a subscriber's terminal, the switching system will perform such segmenting and the subscriber terminal will perform such a reassembly procedure.

The processes of segmenting/reassembling are determined to be functions of the "adaptation layer" in accordance with the CCITT Draft Recommendation I.121. The processing unit of the adaptation layer, including the segmenting/reassembling processes, is hereinafter called "ADP processing unit."

The arrangement of the above-stated ATM switching system is constructed in a similar manner to conventional ISDN switching systems, and the processing of signalling therein, are described with reference to FIG. 9. In this figure, 11 (11-1–11-j) designates optical fibers having a transmission rate of, for example, about 150 Mbit/s; 10 (10-1–10-j) designates subscriber line interfaces which perform, for example, optical/electrical signal conversion; 30 designates an ATM switch for switching cells; 12 (12-1–12-j) designates 8-bit buses.

Cell dropper/inserter circuits 16 (16-1–16-j) are inserted between the subscriber line interfaces 10 and the ATM switch 30. In receiving subsystems (from the subscriber line interfaces 10 to the ATM switch 30), only cells in the signalling channels are separated and extracted, while in transmission subsystems (from the ATM switch 30 to the subscriber line interfaces 10), signalling channel cells are inserted. Cell data from the cell dropper/inserter 16 is multiplexed by a multiplexer/demultiplexer (MUX) 17, and connected to a subscriber line signalling unit 1 via a bus 19. The subscriber line signalling unit 1 comprises: a multiplexer/demultiplexer (MUX) 18, for multiplexing and demultiplexing cell data for each subscriber's line; the above-mentioned ADP processing units 100 (100-1–100-j); LAPD-LSI 101 (101-1 101-j), for processing layer 2 signalling channels; and a bus 103.

In accordance with the above-mentioned system, a drawback exists in that one cell dropper/inserter 16 is necessitated for each subscriber's line, and MUX 17 and buses for connecting them are further required, since only cells in the signalling channels are collected. Further, the MUX 18 and ADP processing units of corresponding subscriber's lines must be provided in the subscriber line signalling unit 1.

An arrangement in which the subscriber line signalling apparatus and subscriber's terminals are interconnected by a switch is disclosed, for example, in Japanese Laid-open Patent Application No. 78637/1988. Such a system does not, however not contemplate any adaptation process and circuitry, such as a scanning unit, for subscriber lines necessary to detect signal frames.

An advantage of the present invention is the provision of a system which provides a signalling apparatus for an ATM switching system which minimizes equipment requirements, thereby providing reduced cost, smaller size, and increased reliability.

SUMMARY OF THE INVENTION

To solve the above-mentioned problems, the subject system provides the subscriber line signalling apparatus, including ADP processing units, on a trunk-line-side of the ATM switch. Collection and distribution of cells in the signalling channels are performed using the ATM switch, and the adaptation process is performed common to the subscriber's lines.

In accordance with the present invention, the subscriber line signalling apparatus including ADP processing units is provided on the trunk-line-side of the ATM switch, and that the collection and distribution of cells in the signalling channels are performed using the ATM switch, whereby any cell dropper/inserter or cell multiplexer/demultiplexer is not necessitated. Also, since the adaptation process is performed common to all subscriber lines, the amount of hardware necessitated for the adaptation process can be reduced.

In accordance with another aspect of the subject invention, the signalling apparatus is adapted with a trunk line signally apparatus placed on the subscriber line side of an ATM switch, working in concert with a subscriber line signally apparatus placed on a trunk line side of the ATM switch.

BRIEF DESCRIPTION OF THE DRAWINGS

The subject invention is described in conjunction with certain figures which are for purposes of illustrating the preferred embodime,.nt of the invention only, and not for the purpose of limiting the same, wherein:

FIGS. 5(A), 5(B) and 5(C) are diagrams for explaining a frame and a cell format;

FIG. 6 is a diagram showing an exemplary arrangement of an ATM switching system applicable to FIGS. 1, 2, 8, and 9;

FIG. 7 is a table illustrating the conversion table memory of FIG. 6;

DETAILED DESCRIPTION OF THE PREFERRED AND ALTERNATE EMBODIMENTS

Figure 1:
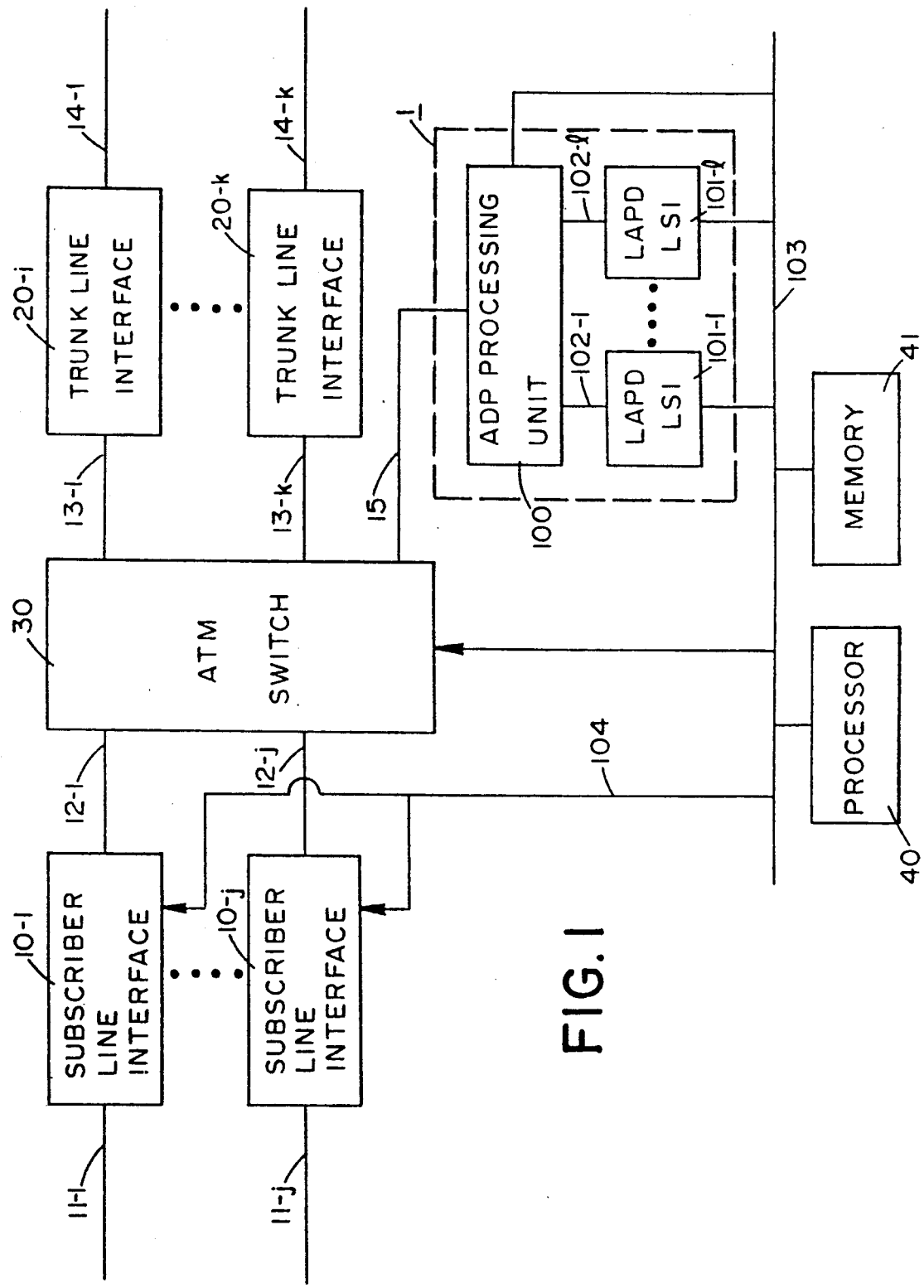
FIG. 1 is a system block diagram showing a first embodiment of the present invention.
Figure 2:
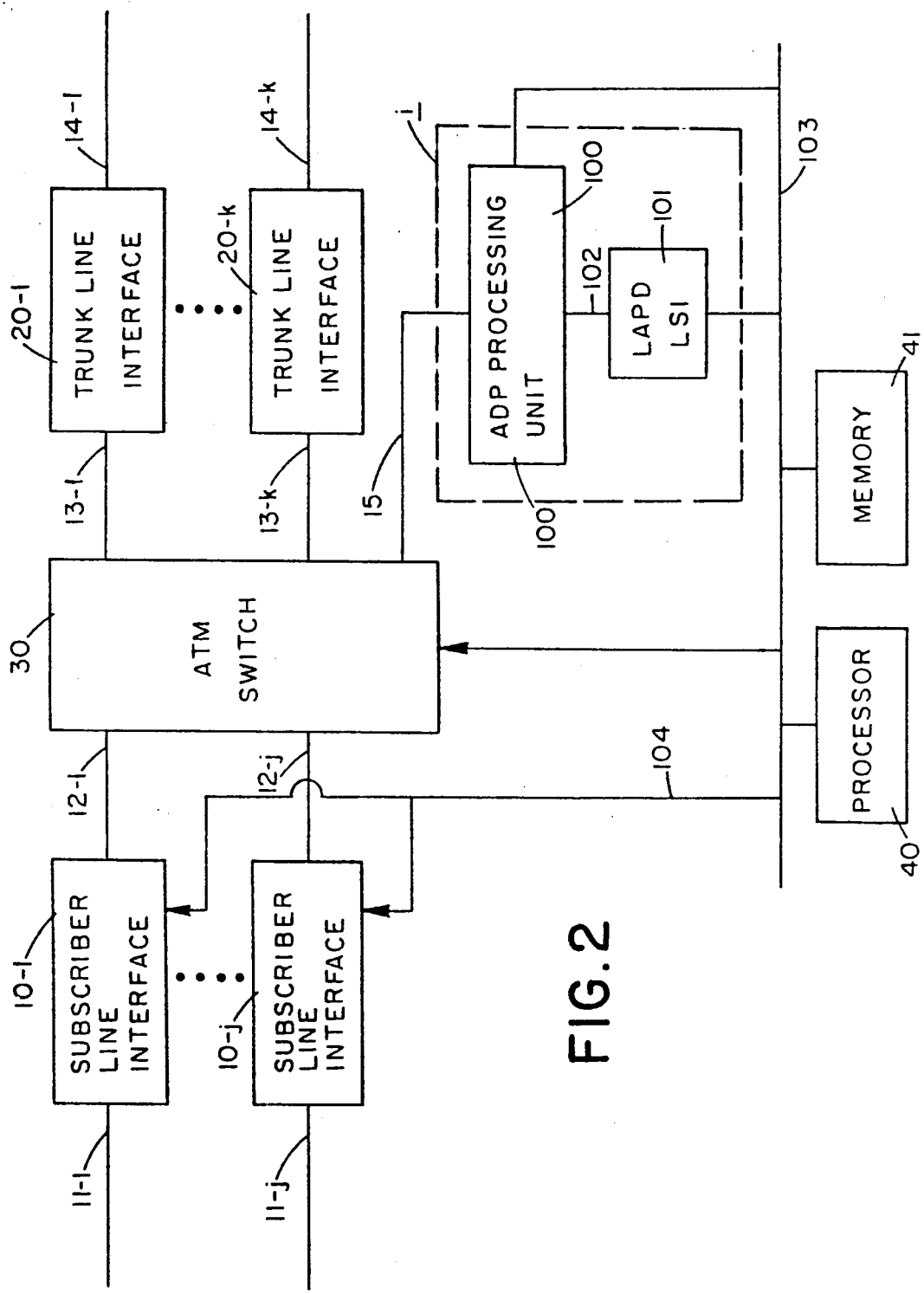
FIG. 2 is a system block diagram showing a second embodiment of the present invention.

Turning now to the drawings, FIGS. 1 and 2. disclose an first embodiment of the present invention in which a subscriber line signalling apparatus 1 includes an ADP processing unit 100 for performing an adaptation process, including segmentation of a communication frame and reassembly of received cells. LAPD-LSI's 101 (101-1–101-1) for perform layer 2 protocol processing of a signalling channel. This apparatus is connected, via a bus 15, to the trunk-line-side of an ATM switch 30. A suitable ATM switch is taught in Also, the subscriber line signalling apparatus 1 is connected, via a bus 103, to a processor 40 for performing, for example, the operation of layer 3 protocol processing of signalling channels, and controlling of the LAPD-LSI's and initializing of an ATM switch. Numeral 11 (11-1–11-k) designates optical fibers, or the like, having a transmission rate of, for example, about 150 Mbits/s. Numeral 14 (14-1–14-k) designates optical fibers having a transmission rate of, for example, about 150 Mbits/s or 600 Mbits/s. Numeral 12 (12-1 12-j), 13 (13-1–13-k) and 15 are suitably formed of eight bit wide buses. Subscriber line interfaces 10 and trunk line interfaces 20 suitably perform optical/electric signal conversion, and add/delete a route information segment to and from individual cells, respectively.

Although the optical fibers 11, 14 and the buses 12 and 13 are illustrated as a single line in FIG. 1, each of these fibers and buses is fabricated from a pair of transmission and reception lines or buses.

Numeral 30 designates an ATM switch for switching fixed length cells, and may be, for example, comprised of a switch of the type described in "A Memory Switch Architecture for ATM Switching Network," IEICE Technical Report IN88-38. Assuming that the numbers of input and output buses of the ATM switch are 32 and 32, respectively, j=32 and k=31 in the figures. If it is desired to have 32 input buses and 32 output buses for switching cells of information channels, then the ATM switch should be provided with 32 input buses and 33 or 34 output buses. One or two buses 15 on the trunk-line-side should be exclusively used for signalling channels.

Though the embodiment of FIG. 1 has one LAPD-LSI for each subscriber line (j=1), the number of LAPD-LSI's may be reduced (j>1) or additional LAPD-LSI's may be provided (j<1) to provide against emergencies. FIG. 2 shows a system in which the process of layer 2 of signalling channels for a plurality of subscriber lines (11-1–11-j) is performed by a single LAPD-LSI 101.

Figure 3:
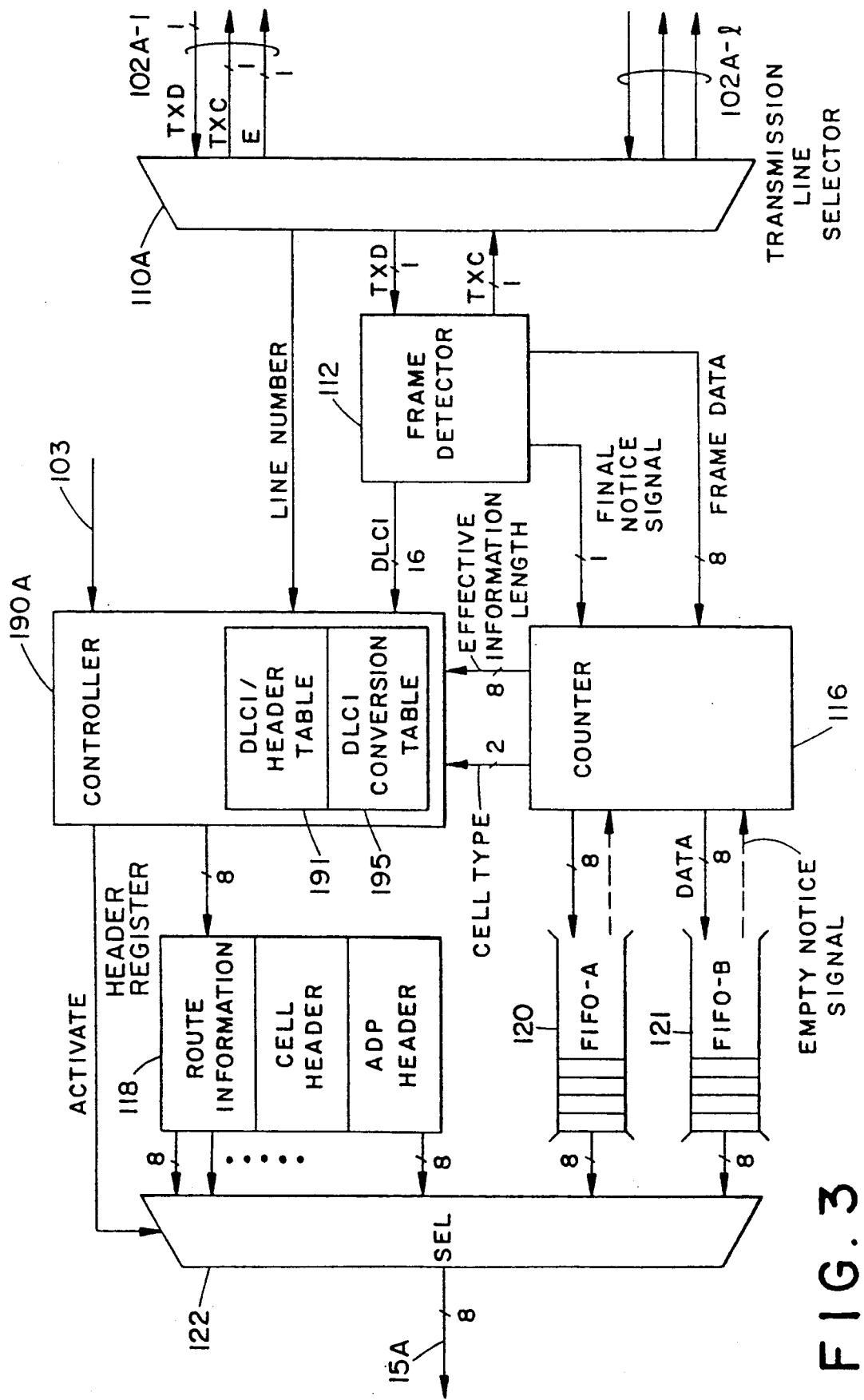
FIG. 3 is a block diagram showing a transmission subsystem in an ADP processing unit.
Figure 4:
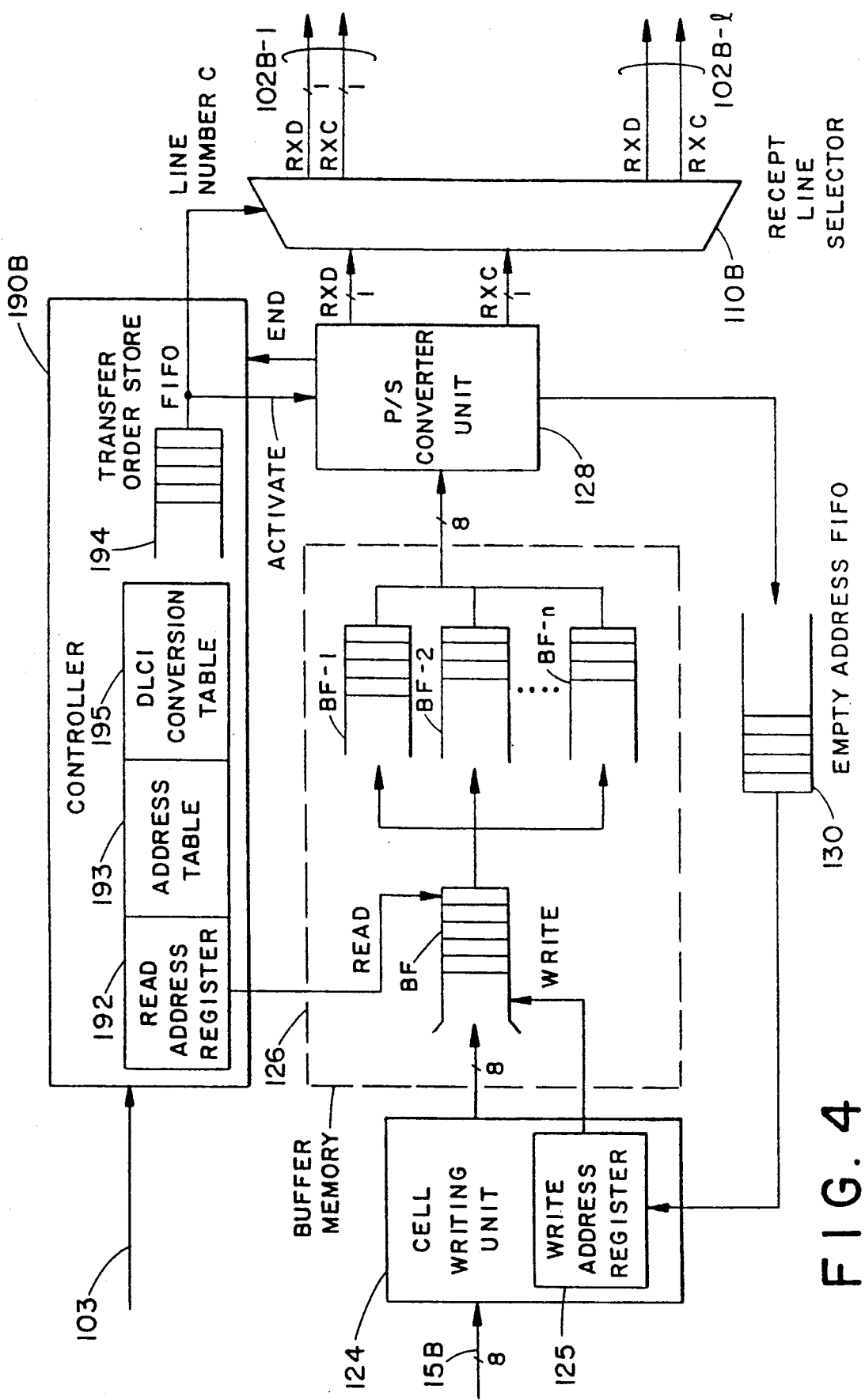
FIG. 4 is a block diagram showing a receiving subsystem in the ADP processing unit 100.

FIG. 3 is a block diagram showing the transmission system in the above-mentioned ADP processing unit 100, and FIG. 4 is a block diagram of receiving system in the ADP processing unit 100.

In the previously mentioned CCITT Draft Recommendation I.121, the final cell format (cell size, etc.) is not yet determined. Thus, a cell format shown in FIG. 5(B) is assumed in the ADP processing in FIGS. 3 and 4. Each cell 51 comprises 36 bytes, and consists of a cell header 52 of 4 bytes and an information field 53 of 32 bytes. The cell header 52 includes first 12 bits which form a VCN (Virtual Channel Number) field for identification of the cell, a reserved field 521 and an HCS (header Check Sequence) field 522 for detecting cell header abnormalities. At the head of the information field 53, there is an ADP header 54 of 2 bytes. Therefore, a region 55 wherein frame data shown in FIG. 5(A) can be stored has 30 bytes for each cell. The ADP header 54 has: a cell type region 542 of 2 bits indicating which type the cell is (i.e. beginning of frame, end of frame, middle of frame, or one-cell=one-frame), as shown in FIG. 5(C); a region 543 of one byte indicating the effective information length of the information field 53; and a reserved region 541.

For example, if the length between the flags 50A and 50F of the frame 50 in FIG. 5(A) is 6 bytes, then it can be segmented into a cell which is of the type "1 cell=1 frame"60 having an effective information length of 6. If the frame length is 40 bytes, then it can be divided into two cells, namely, a first cell of the "beginning of frame" type having an effective information length of 30, and a second cell of the "end of frame" type having an effective information length of 10.

On the other hand, the route information field 56 at the beginning of the cell of FIG. 5(B) is applied thereto only within the ATM switching system, and each cell is otherwise transmitted in a format lacking the above-mentioned route information field 56 through the subscriber lines 11 or through the trunk lines 14. The route information field is used to store therein information specifying the output line to which a cell switched in the ATM switch 30 should be transmitted, and the subscriber line number, etc.

Next, details of the transmitting subsystem of the ADP processing unit will be described with reference to FIG. 3.

A transmission line selector 110a has signal line sets 102a (102a-l-102a-j), each of which consist of three lines, namely, a transmission data (TXD), transmission clock (TXC) and echo (E) lines, and each of which is connected to a corresponding one of LAPD-LSI's 101 (101-1-101-l); the selector 110a has a function of collision control to extract only the frame on a specified line when a plurality of frames are simultaneously transmitted from a plurality of LAPD's. The D-channel access procedure, described in the CCITT Recommendation I.430, may be used as the procedure of the collision control. The line number selected in accordance with the collision control is communicate to a CTL 190, while transmission data is transmitted to a frame detector 112. The transmission line selector 110a is necessary only in the first embodiment of the present invention.

The frame detector 112 will communicate the DLCI (Data Link Connection Identifier) in the address field 50B of the frame to the CTL 190, and will arrange the data from the address field to FCS (Frame Check Sequence) field 50E into an 8-bit parallel data after deleting a '0' bit for flag identification, and transmit it to a counter 116. If the data is the last data of a frame, then such fact is communicated to the counter 116 through a final notice signal line.

The counter 116 will transfer the frame data to an FIFO-A 120. When the FIFO-A has been filled by 30 byte data transferred thereto, or the last data of a frame has been transferred thereto, the cell type 542 and the effective information length 543 shown in the ADP header format of FIG. 5(B) are communicated to the CTL 190, and thereafter it will transfer data from the frame detector 112 to an FIFO-B 121. When the FIFO B has been filled up or the last frame data has been transferred thereto during transfer of data to the FIFO-B, the counter 116 will likewise communicate the cell type and the effective information length to the CTL 190, and will transfer subsequent data to the FIFO-A 120. In the manner as described, the FIFO-A and FIFO-B are alternately used.

The CTL 190 is constituted by, for example, μCPU's, ROM's and RAM's, and contains a DLCI/header corresponding table 191, in which contents of headers (all of the 10 bytes from the route information 56 to the ADP header 54 in FIG. 5(B)) corresponding to the combinations of line numbers and DLCI are set from outside via a control bus 103. The CTL 190 will search the DLCI/header corresponding table 191 upon receiving the communication of the line number and the DLCI, and write the contents of the corresponding table onto a header register 118.

In the second embodiment of the present invention, however, after the DLCI/header corresponding table has been searched, the unique DLCI is converted, using a DLCI conversion table 195, into a DLCI which is actually transmitted to a subscriber device. Subsequently, upon receipt of the communication of the cell type and effective information length from the counter 116, a corresponding register, within a header register 118, is rewritten in accordance with an ADP header format 54 of FIG. 5(B) and a selector (SEL) 122 is activated.

The SEL 122 will first transmit the data in a header register 118, and will next transmit the data in the FIFO- A 120, thereby completing the transmission of the cell. Subsequently, when receiving an activation from the CTL, the SEL 122 will transmit the data in the header register 118, and will then transmit the data in the FIFO-B 121, thereby completing the transmission of the cell. Subsequently, the SEL 122 will transmit the data FIFO-A and the data in the FIFO-B alternately.

Meanwhile, an amount to be processed for forming a header for the transmission of a cell can be reduced by arranging such that the searching of the DLCI/header corresponding table 191 and the setting of the ADP header in the header register are performed separately in the CTL and a reading of the data in the header register 118 will not change such data. For example, when a frame is divided into a plurality of cells for transmission, it is not necessary to search the DLCI/header corresponding table 191 for each cell if the arrangement is such that the searching of the DLCI/header corresponding table is performed only for transmitting the cell at the beginning of the frame and, for the subsequent cells, only the ADP header in the header register 118 is rewritten.

Next, details of the receiving subsystem of the ADP processing unit will be described with reference to FIG. 4. Therein, a cell writing unit 124 is connected with the ATM switch 30 through a receiving bus 15b for receiving cells of a signalling channel from a subscriber unit. The received cell data is transferred to an empty area of a first buffer BF in a buffer memory 126 according to an address indicated by a WA (Write Address) register 125 within the cell writer 124. Subsequently, the data in an empty address FIFO 130 is set in the WA 125 for preparation for receiving the next cell.

The buffer memory 126 (BFM) comprises the first buffer BF of the form of an FIFO for receiving and temporarily storing therein cells arriving there at a rate of, for example, 150 Mbit/s; and second buffers BF-1-BF-n of an FIFO from prepared for respective combinations of line numbers and VCN in cell headers for the subsequent reassembling process. The construction of the BF of the form of FIFO, the manner of using a chain pointer, and the manner of using the WA register 125, RA (Read Address) register 192, and the empty address FIFO 130 are described in the previously mentioned literature "A Memory Switch Architecture for ATM Switching Network".

A CTL 190 has an RA register 192 which corresponds to the first buffer BF, and will check the line number, the VCN in the cell header and the cell type in the ADP header among the contents of the cell of the address indicated by the RA, and will first transfer such cell data to a second buffer BF-i which has the combination of the corresponding line number and VCN. In this case, an actual data transfer from memory to memory is not performed but transfer is performed only by rewriting a second buffer address table 193 provided in the CTL 190 and further rewriting the buffer chain pointer. If checking of the cell type in the ADP header shows that all cells of one frame has been received, then the top address of the buffer wherein the top cell of the frame is stored and the line number is written in a transfer order storing FIFO 194. The CTL 190 will activate a P/S unit 128 in accordance with the data in the transfer order storing FIFO 194 and at the same time specify an output line number to a receipt line selector 110b. In the second embodiment of the present invention, when the P/S unit is activated, a unique DLCI is derived, using a DLCI conversion table 195, from the DLCI from a subscriber unit, and the unique DLCI is simultaneously communicated to the P/S unit.

The P/S unit 128 will read the data of the specified address in response to an activation from the CTL 190, and will convert data other than the header field into a serial data and will transfer such data to the receipt line selector 110b after insertion thereto of "0" and adding a frame delimiting cell type flag 50A, 50F thereto. In the second embodiment of the present invention, conversion into a unique DLCI is also performed.

The receipt line selector 110b is connected with LAPD-LSI 101 (101-1-101-j), via signal line sets 102b (102b-l-102b-j), each of which consists of two lines, namely, a receipt data line (RxD) and a receipt clock (RxC), and has a function of transmitting data only to a signal line having a line number specified by the CTL 190. Meanwhile, the receipt line selector 110b is, as is the transmission line selector shown in FIG. 3, necessitated only in the arrangement of the first embodiment and not necessary in the arrangement of the second embodiment.

Though the above embodiment are arranged to control each hardware in the ADP processing unit by means of the CTL unit 190 which uses a μCPU, it is also possible to increase the processing rate by implementation all the functions of the CTL by hardware. In such case, in FIG. 4, the first buffer BF for rate adaptation (waiting) may be omitted, and the contents of the header may be checked in the cell writer and the cell data may be directly transferred to the second buffers BF-1-BF-n.

Where management of VCN is performed for each subscriber line separately from the others, different subscribers can simultaneously transmit cells having the same VCN. Then, in accordance with a system in which an ADP processing unit is provided common to a plurality of subscriber lines, identification of cells only from the VCN will mix cells from different subscribers, with the result that reassembling cannot normally performed. In accordance with the present invention, when a cell is received from a subscriber, route information 56 is added to the cell, where the subscriber line number is stored, and further in the ADP processing unit receipt system the cell is identified from such subscriber line number and the VCN, whereby reassembling can be normally performed. Further, the arrangement may be such that the subscriber line number is not recorded, and the VCN of the cell is converted in the subscriber line interface 10 into a VCN unique to the VCN used for subscriber lines 1 . . . j. Further, where the management of DLC is performed for each subscriber line separately from the others, different subscribers can simultaneously use the same DLCI. Then, in accordance with the arrangement of the second embodiment (FIG. 2), wherein a LAPD-LSI is provided common to a plurality of subscriber lines, two or more links having the same DLCI for different subscribers cannot be discriminated. In this case, links can be normally discriminated if the arrangement is such that a DLCI conversion table is provided in the ADP processing unit 100 and, between the LAPD-LSI 101 and the ADP processing unit 100, unique DLCI's are used for the subscriber lines 1 . . . j.

Turning now to FIG. 6, with continued reference to FIG. 5, shown in detail is construction of the subscriber line interface 10-i. The subscriber line interface 10-i communicates route information 56 from each cell 51 inputted from the ATM switch 30 through reception bus 12A, a parallel/serial (P/S) converter 202 for converting parallel data of the input cell which has no route information to bit serial data, and electrical/optical (E/O) signal converter 203 for converting the bit serial data to optical signals.

The subscriber line interface 10-i further comprises an optical/electrical (O/E) signal converter 204 for converting optical signals transmitted from a subscriber terminal onto a transmission optical fiber 11B to bit serial electrical signals, a serial/parallel (S/P) converter 205 for converting the bit serial signal to 8-bit parallel data, a header separator circuit 206, a header inserter circuit 207, and a header conversion table memory 208.

As stated hereinbefore, each cell transmitted from the subscriber terminal includes a cell header 52 and an information field 53 as shown in FIG. 5B. The header separator circuit 206 operates to separate the cell header 52 from the received cell in order to access the header conversion table 208 in accordance with the value of field VCN extracted from the header, and to provide the information field 53 of the received cell to the header inserter circuit 207.

The header conversion table means 208 stores a plurality of records, each of which comprises route information 56, and a new header 52 including a new VCN 520 as shown in FIG. 7. One of these records is read out to the header inserter circuit 207 by addressing in accordance with the extracted VCN. The header inserter circuit 207 operates to output a header converted cell which has a route information field 56 and a new cell header 52 onto a transmission bus 12B.

If an input (extracted) VCN has a value corresponding to the signalling channel, a record which includes route information to designate the bus 15 as an output port is read out. If the input VCN corresponds to an information channel, a record which designates one of output busses 13-1 through 13-k is read out. The contents of the header conversion table memory 208 are prepared by the processor 40 through a bus 104.

Figure 8:
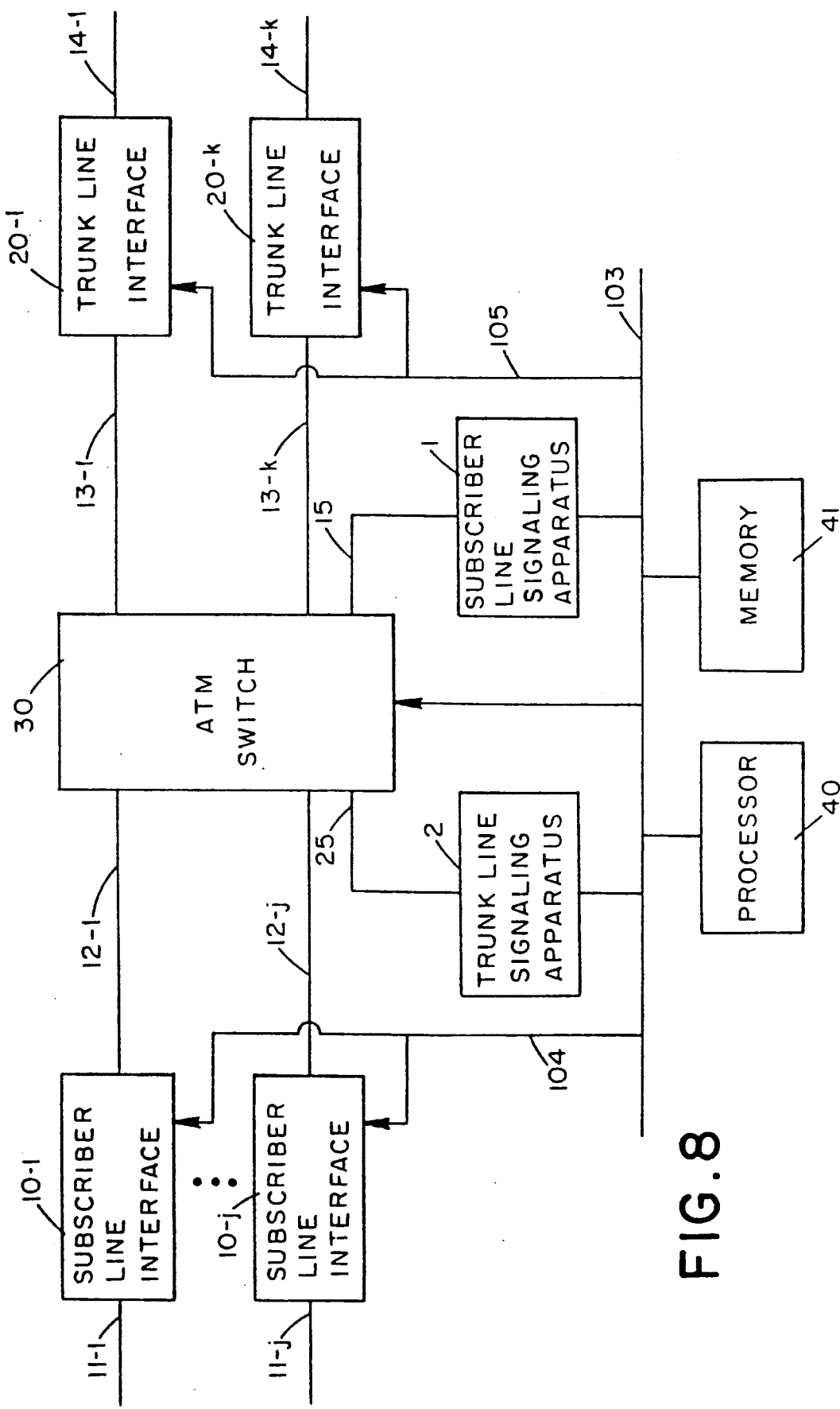
FIG. 8 illustrates an embodiment of the subject invention employing a trunk side signalling processor.
Figure 9:
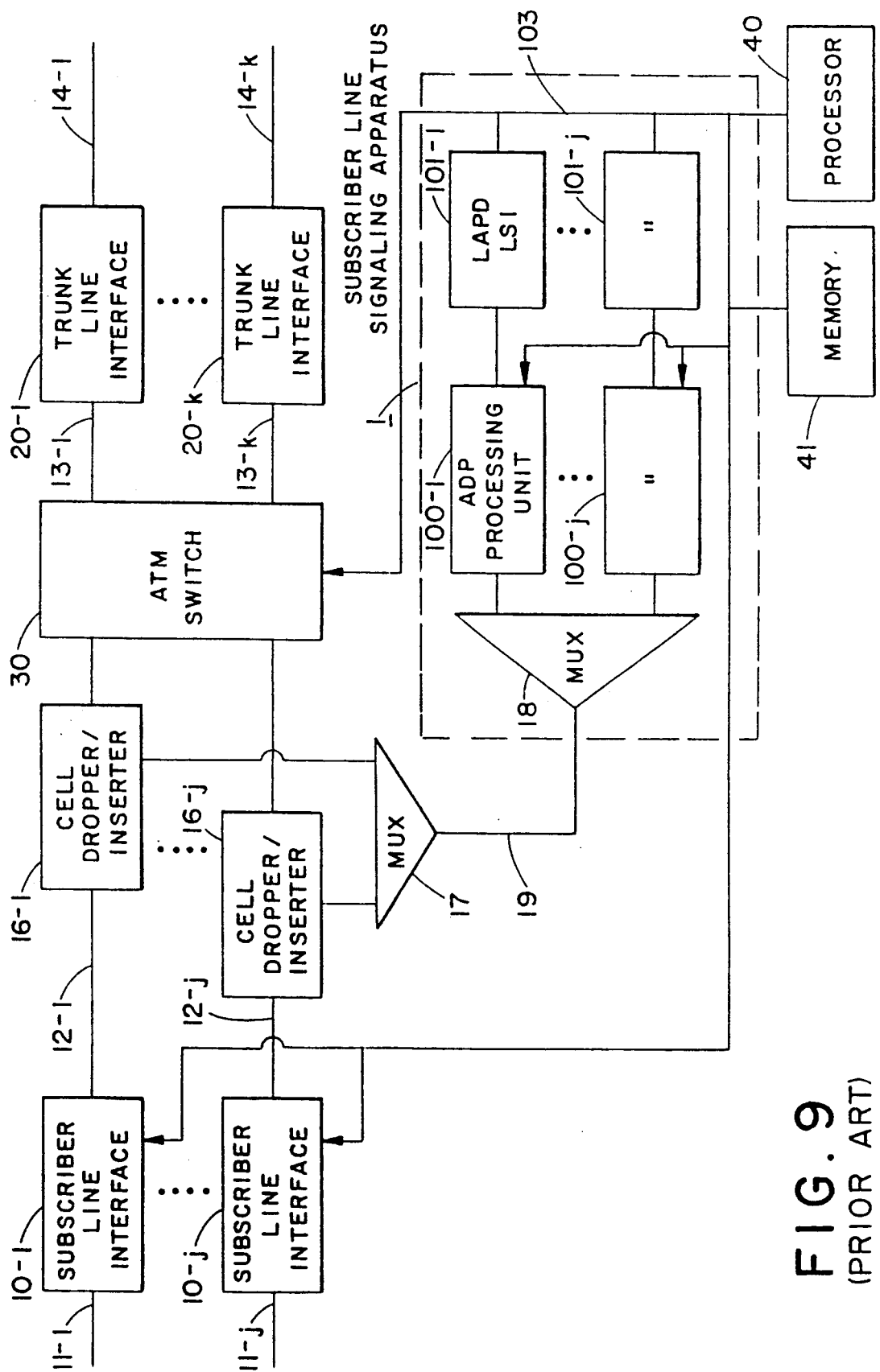
FIG. 9 is a system block diagram to which a conventional method of construction for a signalling apparatus is applied.

FIG. 8 shows a third embodiment of the present invention. In this embodiment, a signalling control system, the same as that which is adopted in the first or second embodiment is also applied to the trunk line signal processing. A trunk line signalling apparatus 2 has substantially the same construction as the line signalling apparatus shown in FIGS. 1 or 2.

In FIG. 8, signalling channel cells transmitted from the subscriber terminal are relayed to the bus 15 by the ATM switch 30. A reassembly process cell(s) to a frame and the layer 2 process are performed by the subscriber line signalling apparatus, whereby a signalling channel message extracted from the reassembled frame is supplied to the processor 40. Each trunk line interface (20-1-20-k) may have the same construction as the subscriber line interface shown in FIG. 6.

Similar to this process, signalling channel cells transmitted from another ATM switch through one of the optical fibers 14-1 through 14-k are relayed to a bus 25 by the ATM switch 30 and inputted to the trunk line signalling apparatus 2. The trunk line signalling apparatus 2 performs the reassembling from the received cells to a frame and the level 2 process, so that a signalling channel message extracted from the reassembled frame is also supplied to the processor 40.

The processor 40 performs a layer 3 process as to the signalling channel message supplied from the signalling apparatuses 1 and 2. As a result, if it is necessary to transmit a new signalling channel message to another ATM switch, the processor 40 suitably communicates a request for transmitting the new message to the trunk line signalling apparatus. The trunk line signalling apparatus performs the layer 2 processing and the segmenting process as to the new message, and sends out a series of new cells thus produced to the ATM switch 30 through the bus 25.

These cells are relayed to one of the trunk line buses 13-1 through 13-k according to their route information which is added by the ADP processing unit in the trunk line signalling apparatus.

Each of the trunk line interfaces 20-1 through 20-k is provided with a header conversion table memory namely as the subscriber line interface 10-i shown in FIG. 8. The contents of the table are also managed by the processor via a bus line 105.

As is clear from the above description, the subscriber line signalling apparatus is provided on the trunk-line-side of an ATM switch in an ATM switching system according to the present invention, and an ADP processing unit is provided common to the subscriber lines, whereby advantages can be achieved in that the cell dropper/inserters, one for each subscriber line, buses for line collection/distribution or multiplexer/demultiplexers necessitated in a subscriber line signalling apparatus constructed in a similar manner to prior art ISDN switching systems can be omitted and the ADP processing units can be reduced in number, so that the amount of hardware can be reduced.

Figure 10:
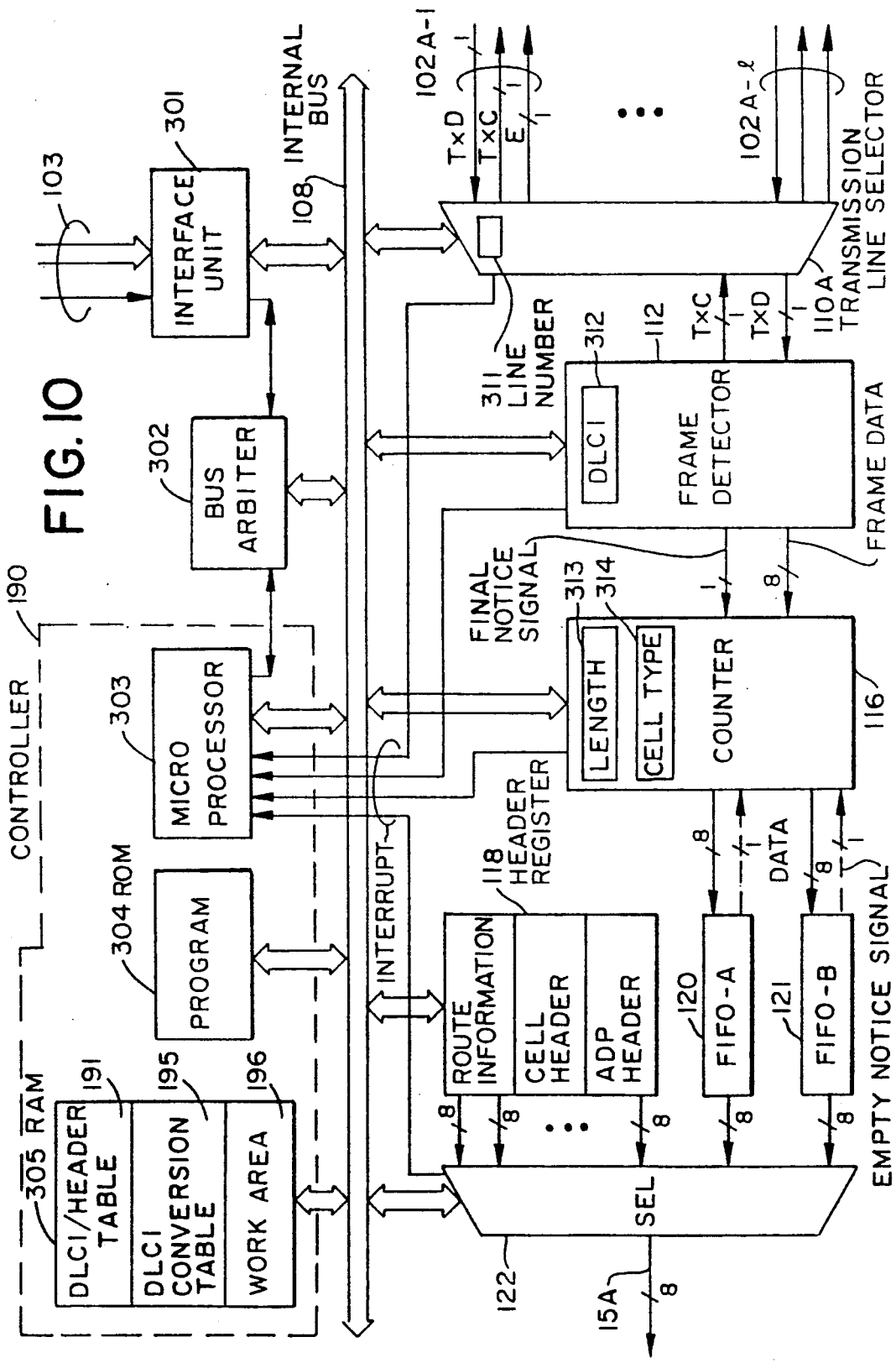
FIG. 10 illustrates a fabrication scheme of the subject system.
Figure 11:
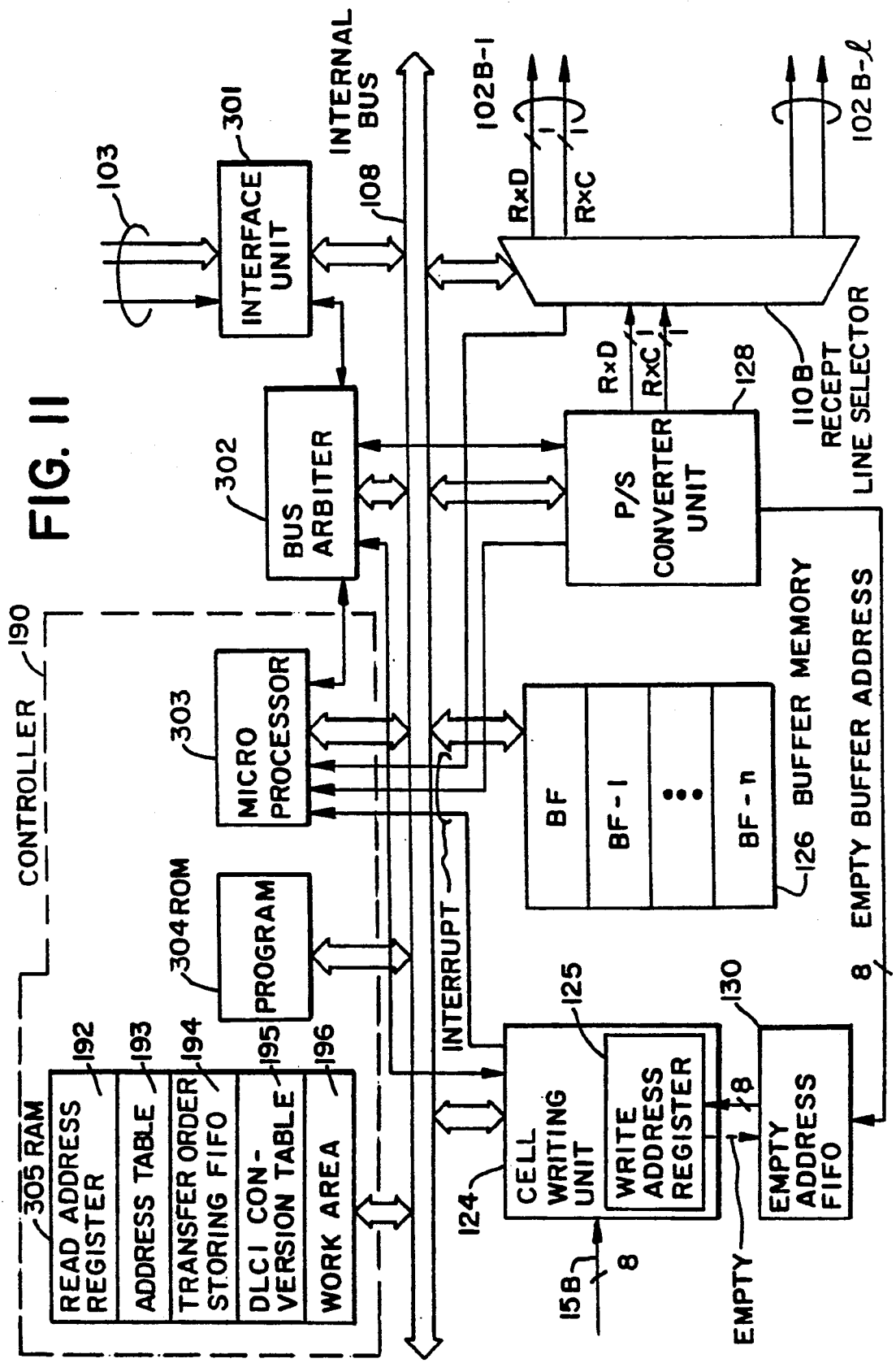
FIG. 11 illustrates an alternate fabrication scheme of the subject invention.
Figure 12:
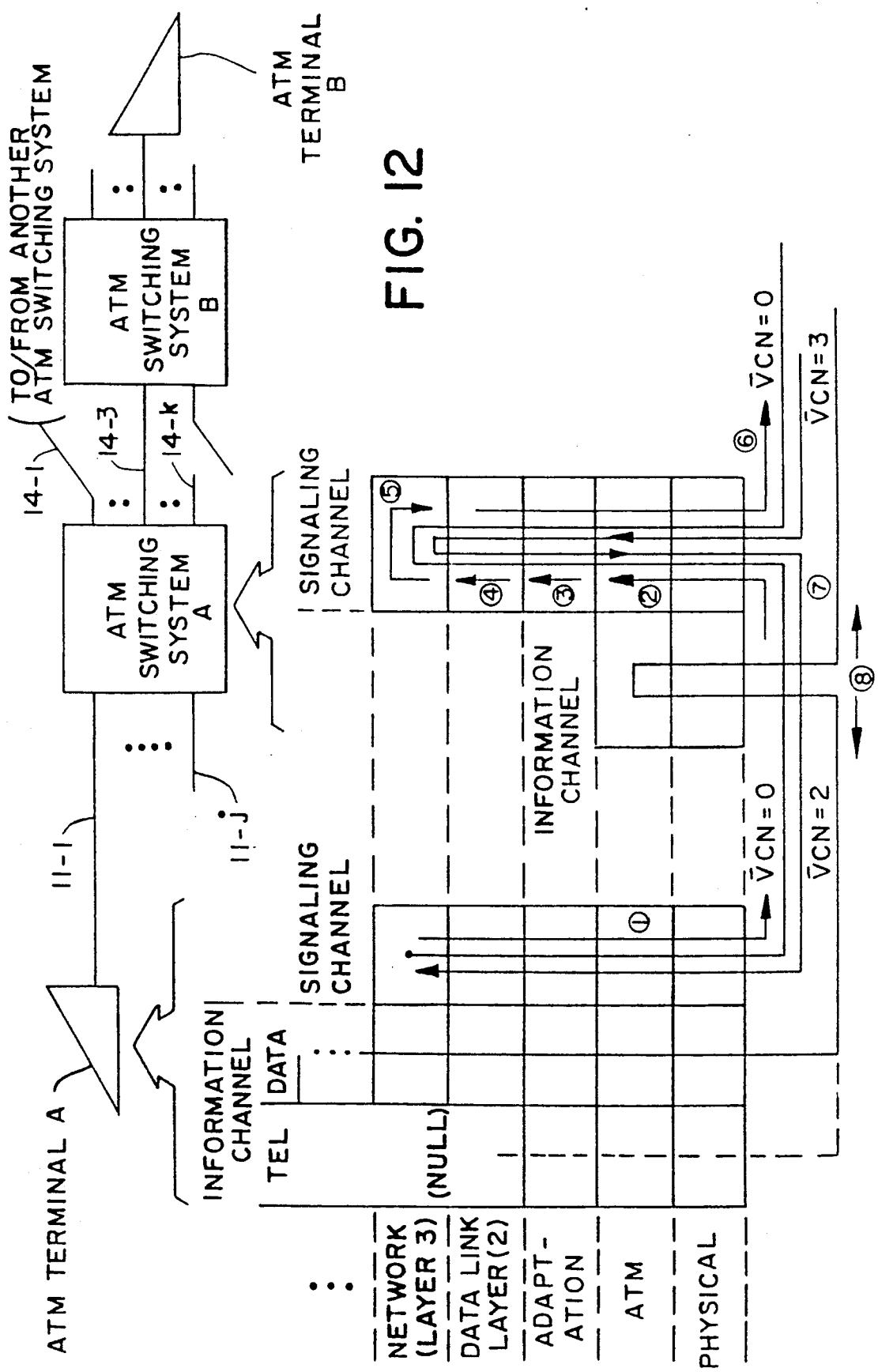
FIG. 12 an ATM switching network.

FIG. 10 and FIG. 11 are examples of the actual construction for the transmitting subsystem of FIG. 3 and receiving subsystem of FIG. 4 of the ADP processing, respectively. FIG. 12 shows an ATM switching network and layer model of an ATM terminal and an ATM switching system.

Having thus described the invention, it is now claimed:

1. A broadband communication system comprising:
   a plurality of interface means each for communicating cell data with a pair of transmission lines;
   an asynchronous transfer mode switching means having a plurality of pairs of input and output lines operatively connected to the interface means for communicating cell data therewith; and
   a subscriber line signalling apparatus connected with the switching means through one of said pairs of input and output lines;
   the switching means including means for communicating control data cells with the subscriber line signalling apparatus through said one pair of input and output lines;
   the subscriber line signalling apparatus including,
      an adaptation processing unit for performing at least one of reassembly and segmentation of cell data to frame data,
      a link access processing means for processing frame data, and
      means for communicating frame data between the link access processing means and an associated data processing element.

2. The broadband communication system of claim 1 wherein the adaptation processing unit includes:
   means for detecting frame data;
   buffer means for apportioning cell data in fixed length increments from the frame data;
   means for queuing the cell data in fixed length increments;
   means for isolating cell identification information;
   means for appending the cell identification information to the cell data in fixed length increments; and
   means for communicating the cell data to the asynchronous mode switching means.

3. The broadband communication system of claim 2 wherein the adaptation processing unit further includes:
   means for detecting a series of data frames;
   means for storing frame data within the series of data frames;
   means for detecting a completion of a series of data frames; and
   means for communicating the cell data to the asynchronous transfer mode switching means upon a detection of a completed series of data frames.

4. The broadband communication system of claim 1 wherein the adaptation processing unit includes:
   means for receiving a sequence of data cells from the asynchronous transfer mode switching means;
   means for separating cell data from identification information appended thereto;
   means for acquiring address information from an associated data processing unit;
   means for accumulating the cell data;
   means for computing data link communication identifier data from the cell identification information and the address information;
   means for appending the data link communication identifier to the accumulated cell data to form frame data; and
   means for communicating the frame data to the link access processing means.

5. The broadband communication system of claim 3 wherein the adaptation processing unit further includes:
   means for receiving a sequence of data cells from the asynchronous transfer mode switching means;
   means for separating cell data from identification information appended thereto;
   means for acquiring address information from an associated data processing unit;
   means for accumulating the cell data;
   means for computing data link communication identifier data from the cell identification information and the address information;
   means for appending the data link communication identifier to the accumulated cell data to form frame data;
   means for communicating the frame data to the link access processing means.

6. The broadband communication system of claim 1 wherein the interface means includes means for communicating cell data with a plurality of transmission lines, and wherein the asynchronous mode switching means includes means for selectively switching the plurality of transmission lines.

7. The broadband communication system of claim 6 wherein the associated data processing element is comprised of a plurality of subscriber terminals.

8. The broadband communication system of claim 7 wherein the subscriber line signalling apparatus includes a link access processing means for each of the plurality of subscriber terminals.

9. A broadband communication method comprising the steps of:
   communicating cell data with transmission lines to an asynchronous transfer mode switching means;
   communicating control data cells between the switching means and a subscriber line signalling apparatus through one of pairs of input and output lines of the switching means;

performing at least one of reassembly and segmentation of cell data to frame data by the subscriber line signalling apparatus;

processing frame data for communication to an associated data processing element by the subscriber line signalling apparatus; and communicating processed frame data between the subscriber line signalling apparatus and the associated data processing element.

10. The method of claim 9 further comprising the steps performed by said subscriber line signalling apparatus of:

detecting the presence of frame data;

apportioning cell data in fixed length increments from the frame data;

queuing the cell data in fixed length increments;

isolating cell identification information;

appending the cell identification information to the cell data in fixed length increments; and communicating the cell data to the asynchronous transfer mode switching means.

11. The method of claim 10 further comprising the steps performed by said subscriber line signalling apparatus of:

detecting a series of data frames;

storing frame data for a series of data frames;

detecting a completion of a series of data frames; and communicating the cell data to the asynchronous transfer mode switching means upon a detection of a completed series of data frames.

12. The method of claim 9 further comprising the steps performed by said subscribed line signalling apparatus of:

receiving a sequence of data cells from the asynchronous transfer mode switching means;

separating cell data from identification information appended thereto;

acquiring address information from an associated data processing unit;

accumulating the cell data;

computing data link communication identifier data from the cell identification information and the address information;

appending the data link communication identifier to the accumulated cell data to form frame data; and processing the frame data to perform link access control.

13. The method of claim 11 further comprising the steps performed by said subscriber line signalling apparatus of:

receiving a sequence of data cells from the asynchronous transfer mode switching means;

separating cell data from identification information appended thereto;

acquiring address information from an associated data processing unit;

accumulating the cell data;

computing data link communication identifier data from the cell identification and the address information;

appending the data link communication identifier to the accumulated cell data to from frame data; and processing the frame data to perform link access procedure.

14. A subscriber line signalling apparatus comprising:

a switching circuit having a plurality of input terminals and a plurality of output terminals, the switching circuit including means for directing a series of fixed length information packets in input terminals thereof to a selected output terminal thereof;

a signalling frame processor for communicating a signal frame to an associated data processing element; and an adaptation processing unit for receiving fixed length information packets from an output of the switching circuit, the adaptation processing unit including means for communicating the fixed length information packets to the signalling frame processor in a signal frame form.

15. The subscriber line signalling apparatus of claim 14 further comprising a plurality of signal frame processor units for communicating a signal frame to a plurality of subscriber lines.

16. The subscriber line signalling apparatus of claim 14 further comprising means for communicating a signal frame of the signal frame processor to a plurality of subscriber lines.

17. The subscriber line signalling apparatus of claim 14 further comprising:

means for providing an information field, including a subscriber circuit number, to each of the fixed length packets; and wherein the adaptation processing unit includes means for channeling data of an information packet to a selected subscriber line in accordance with the information field.

18. The subscriber line signalling apparatus of claim 14 wherein the adaptation processing unit include means for converting a link identification number of a signal frame.

19. A broadband communication system comprising:

interface means for communicating cell data with an input transmission line;

an asynchronous transfer mode switching means operatively connected to the interface means for communicating cell data therewith;

means for communicating cell data between the asynchronous transfer mode switching means and a subscriber line signalling apparatus;

the subscriber line signalling apparatus including,
an adaptation processing unit for performing assembly of cell data to frame data,
a data link processing means for processing frame data, and
means for communicating frame data between the link access processing means and an associated data processing element;

means for communicating frame data from the associated data processing element to a trunk line signalling apparatus;

the trunk line signalling apparatus including an adaptation processing unit for performing segmentation of frame data to assembled cell data; and means for communicating assembled cell data between the trunk line signal processing apparatus and the asynchronous transfer mode switching means.

20. The broadband communication system of claim 19 further comprising means for communicating assembled cell data between the asynchronous transfer mode switch and an output transmission line.

* * * * *

UNITED STATES PATENT AND TRADEMARK OFFICE
CERTIFICATE OF CORRECTION

PATENT NO. : 5,101,404
DATED : March 31, 1992
INVENTOR(S) : Kunimoto et al.

It is certified that error appears in the above-identified patent and that said Letters Patent is hereby corrected as shown below:

Claim 13, column 11, line 61, after "identification" insert --information--

Claim 18, column 12, line 33, delete "include" and replace with --includes--

Signed and Sealed this

Fifth Day of October, 1993

Attest:

BRUCE LEHMAN

Attesting Officer      Commissioner of Patents and Trademarks